(12) United States Patent
Hills et al.

(10) Patent No.: US 8,852,334 B1
(45) Date of Patent: Oct. 7, 2014

(54) LOW PH COMPOSITIONS FOR HARDENING CONCRETE AND ASSOCIATED METHODS

(75) Inventors: Dal N. Hills, Midway, UT (US); Kent Barrus, Provo, UT (US)

(73) Assignee: Arris Technologies, LLC, Bondurant, WY (US)

( * ) Notice: Subject to any disclaimer, the term of this patent is extended or adjusted under 35 U.S.C. 154(b) by 753 days.

(21) Appl. No.: 12/366,584

(22) Filed: Feb. 5, 2009

Related U.S. Application Data

(60) Provisional application No. 61/026,427, filed on Feb. 5, 2008, provisional application No. 61/026,336, filed on Feb. 5, 2008.

(51) Int. Cl.
*C04B 14/04* (2006.01)

(52) U.S. Cl.
USPC .......................... 106/600; 427/421; 427/427

(58) Field of Classification Search
CPC ................................ C04B 14/04; C04B 14/062
USPC .................................. 106/600; 427/421, 427
See application file for complete search history.

(56) References Cited

U.S. PATENT DOCUMENTS

| | | | | |
|---|---|---|---|---|
| 3,976,497 A * | 8/1976 | Clark | ....... | 106/287.16 |
| 4,144,074 A * | 3/1979 | Itoh et al. | ....... | 106/1.17 |
| 4,273,813 A * | 6/1981 | Meddaugh | ....... | 427/387 |
| 4,330,446 A * | 5/1982 | Miyosawa | ....... | 523/409 |
| 5,370,919 A * | 12/1994 | Fieuws et al. | ....... | 428/96 |
| 5,431,852 A * | 7/1995 | Kaijou | ....... | 516/55 |
| 5,584,921 A * | 12/1996 | Wagner et al. | ....... | 106/287.1 |
| 5,895,688 A * | 4/1999 | Bertoncini et al. | ....... | 427/426 |
| 5,932,000 A * | 8/1999 | Bergqvist et al. | ....... | 106/737 |
| 5,945,169 A * | 8/1999 | Netti et al. | ....... | 427/430.1 |
| 6,187,851 B1 * | 2/2001 | Netti et al. | ....... | 524/442 |
| 6,800,130 B2 * | 10/2004 | Greenwood et al. | ....... | 106/737 |
| 7,608,143 B2 * | 10/2009 | Brown | ....... | 106/724 |
| 7,732,497 B2 * | 6/2010 | Cumberland et al. | ....... | 516/111 |
| 8,092,588 B2 * | 1/2012 | Bowers | ....... | 106/600 |
| 2006/0178463 A1 * | 8/2006 | Sacks | ....... | 524/444 |
| 2007/0129478 A1 * | 6/2007 | Nakamura et al. | ....... | 524/492 |
| 2008/0081217 A1 * | 4/2008 | Bowers | ....... | 428/703 |
| 2008/0261024 A1 * | 10/2008 | Xenopoulos et al. | ....... | 428/331 |
| 2009/0050018 A1 * | 2/2009 | Kishimoto | ....... | 106/286.8 |
| 2009/0142604 A1 * | 6/2009 | Imai et al. | ....... | 428/447 |
| 2009/0169750 A1 * | 7/2009 | Wilkins et al. | ....... | 427/287 |
| 2011/0111216 A1 * | 5/2011 | Bowers | ....... | 428/337 |

* cited by examiner

*Primary Examiner* — Paul Marcantoni
(74) *Attorney, Agent, or Firm* — Durham Jones & Pinegar Intellectual Property Law Group

(57) ABSTRACT

A composition for hardening concrete that has a pH of less than 10, and may have a pH of 8 or less. Thus, the hardening composition may be free of or substantially free of alkaline materials. The hardening composition is water-based and includes silica particles and an aluminum-based (e.g., alumina, etc.) stabilizer, which may be present on portions of the surfaces of the silica particles. In use, the hardening composition is applied to the surface of concrete, either alone, with curing compounds, or as part of a polishing process. Any residue that remains on the treated surface may simply be swept, blown, or sprayed away.

46 Claims, No Drawings

LOW PH COMPOSITIONS FOR HARDENING CONCRETE AND ASSOCIATED METHODS

CROSS-REFERENCE TO RELATED APPLICATIONS

This application is a utility conversion of U.S. Provisional Patent Application Ser. No. 61/027,366, filed Feb. 8, 2008, for "Low pH Compositions for Hardening Concrete and Associated Methods," and of U.S. Provisional Patent Application Ser. No. 61,026,427, filed Feb. 5, 2008, for "Low pH Compositions for Hardening Concrete and Associated Methods."

TECHNICAL FIELD

The present invention, in various embodiments, relates generally to chemical compositions and to methods for treating concrete, masonry, or stone, and, more specifically, to chemical compositions for hardening concrete, masonry, and stone that have a pH of less than 10, as well as to methods relating to the use of such compositions.

BACKGROUND

When concrete hardens or cures, calcium hydroxide (Ca(OH)$_2$, or "free lime") forms in small "deposits" throughout the substrate. Calcium hydroxide is a soft, weak material. Consequently, deposits of calcium hydroxide that are present at surfaces of concrete can, over time, compromise the integrity of the concrete.

Various compounds are known to be useful for reacting with calcium hydroxide to harden concrete, masonry, and stone. These compounds include silicas, silicates, siliconates, and mixtures of silicates and siliconates. The silicas, silicates, and/or siliconates of these materials react chemically with soft, weak calcium hydroxide to form stronger materials, densifying and strengthening the treated surface.

Silicas, silicates, and siliconates are widely available in water-based, or aqueous, solutions. These solutions are typically alkaline, or basic, with a pH of 10 or more. The relatively high pH "stabilizes" these solutions by imparting the suspended silica, silicate, and/or siliconate particles with a negative, repulsive charge that prevents the particles from aggregating and, thus, from falling out of, or precipitating from, the solution. When the pH of a conventional hardening solution drops below 10 (e.g., to 8), the effective negative charge on the particles decreases. As a result, the particles no longer repel one another. Instead, they begin to aggregate and precipitate. Stated another way, the solution destabilizes. From the foregoing, it is apparent that conventional concrete hardeners remain stable over a relatively narrow pH range.

When conventional hardeners that have been applied to concrete, masonry, or stone surfaces puddle, they leave a hard, white residue that is difficult to remove, often requiring additional chemical treatments, scrubbing, scraping, sanding, polishing, or other labor-intensive processes. As a consequence, an undesirably significant amount of labor is often required to treat concrete, masonry, or stone with conventional hardeners.

SUMMARY

In one aspect, the present invention includes compounds for hardening concrete, masonry, or stone. For the sake of simplicity, the term "concrete," as used herein, includes concrete, masonry, stone, and other similar materials.

Hardening compositions that incorporate teachings of the present invention include particles that remain in solution at, or stable over, a relatively low pH (e.g., at a pH of about 3, at a pH of about 3.5, etc.), at a substantially neutral pH, or over a relatively large pH range (e.g., at a pH of about 4 to about 7, at a pH of about 3.5 to about 10.5, etc.). Due to the stability of such compositions at substantially neutral pH (e.g., at a pH of 8 or less), they also may be referred to herein as "low pH hardening compositions" or, even more simply, as "low pH compositions." The low pH of hardening compositions of the present invention may be due, at least in part, to their lack or substantial lack of alkaline materials, such as sodium or potassium or lithium.

In a specific embodiment, such a hardening composition includes particles (e.g., silica particles, etc.) and a stabilizer that comprises an aluminum compound (e.g., aluminum, aluminum oxide (alumina), or Al$_2$O$_3$), etc.). The aluminum compound may be present at or on portions of the surfaces of the particles. In addition to the particles and the stabilizer, the compound may include a surfactant (e.g., an anionic surfactant, a non ionic surfactant, etc.).

Methods for formulating low pH hardening compounds are also within the scope of the present invention.

According to another aspect, the present invention includes methods for hardening concrete. Such methods may simply include application of a low pH hardening composition to fresh concrete or fully cured concrete. In some embodiments, the low pH hardening composition may be applied to a surface of the concrete just before or during polishing.

In another aspect, the present invention includes methods for cleaning a surface of concrete following the application of a hardening composition to the surface. One embodiment of such a method consists essentially of sweeping, blowing, or spraying residue of the hardening composition from the surface of the concrete to substantially remove the residue from the surface.

Other aspects of the invention, as well as their features and advantages, will become apparent to those in the art through consideration of the ensuing description and the appended claims.

DETAILED DESCRIPTION

An embodiment of a hardening composition according to the present invention includes colloidal silica particles that are suspended in a water-based, or aqueous, solution. A stabilizer, which prevents aggregation of the silica particles and their precipitation from solution, may be present on portions of the surfaces of the silica particles. The stabilizer may comprise an aluminum compound, such as aluminum or aluminum oxide. In addition to the water, the silica particles, and the stabilizer, the hardening composition may, in some embodiments, include a surfactant, which also facilitates suspension of the silica particles in the water.

The silica particles remain suspended in the hardening composition at a relatively low, substantially neutral (e.g., pH=6 to 8) or acidic pH. As an example, the silica particles may remain in solution at a pH of as low as about 3 or about 3½ and as high as about 10 or about 10½. In a more specific example, the pH of a hardening composition of the present invention may be about 4 to about 7. In an even more specific example, a hardening composition that incorporates teachings of the present invention may have a pH of about 3½ to about 7.

In various embodiments, the silica particles and stabilizer of a hardening composition may be provided as a colloidal silica suspension that includes silica particles having nominal sizes (e.g., diameters) of from about 3 nm to about 50 nm with an aluminum-based stabilizer.

The colloidal silica suspension available from Grace Davison of Columbia, Md., as LUDOX® HSA is an example of a colloidal silica suspension that falls within the scope of the teachings of the present invention. That colloidal silica includes a silica content of 29.0% to 31.0%, by weight of the solution, with a nominal particle size (e.g., diameter) of 12 nm and a pH of 3.5 to 5.0.

The colloidal silica suspension may comprise as little as about 5% of the weight of the hardening compound for applications in which the surface that is to be treated is dense, about 15% to about 20% of the weight of the hardening composition when the surface to be treated is new concrete, or as much as about 50% of the weight of the hardening composition when the surface to be treated is highly porous, as is often the case with old concrete. The amount of silica included in the hardening composition may be tailored to provide the desired treatment effect (e.g., hardening, polishing, etc.) without requiring an unnecessarily large number of applications (e.g., more than one application) and while minimizing the amount of residue that remains on a surface after treatment of the surface, or minimizing wastage of the silica. In some embodiments, the amount of silica may be tailored to leave no residue on the treated surface.

Embodiments of hardening compositions that include surfactants may include an anionic (i.e., negatively charged) surfactant, such as NIAPROOF®, Anionic, Surfactant 08 from Niacet or a non-ionic (i.e., no electrical charge) surfactant, such as the polyether siloxane copolymer available from Evonik Industries' Tego brand of Essen, Germany, as TEGO® Wet KL-245. The surfactant may account for as little as about 0.1% of the weight of the hardening composition, or as much as about 2% of the weight of the hardening composition.

Some embodiments of hardening compositions according to the present invention may altogether lack a surfactant.

The remainder, or balance, of the weight of a hardening composition of the present invention may comprise water.

A specific embodiment of hardening composition that incorporates teachings of the present invention includes 15%, by weight, LUDOX® HSA, 0.5%, by weight, non-ionic surfactant, with the balance (i.e., 84.5%, by weight) comprising water. Another specific embodiment of hardening composition includes 15%, by weight, LUDOX® HSA, 0.3%, by weight, anionic surfactant, with the balance (i.e., 84.7%, by weight) comprising water.

A hardening composition that incorporates teachings of the present invention may be applied to and allowed to penetrate into concrete. Application of the hardening composition may be effected by spraying, alone or in combination with brushing, or brooming, the hardening composition into the surface to which the hardening composition is applied. Of course, other suitable application techniques are also within the scope of the present invention.

In one embodiment of an application method according to the present invention, the hardening composition is applied to a surface of material (e.g., concrete) that has been substantially cured or fully cured. Prior to applying the hardening composition, any debris is cleared from the surface to which the hardening composition is to be applied. Additionally, that surface may be planed, honed, and/or polished (e.g., with a 100 grit (rougher) to 400 grit (finer) pad or polishing compound). The hardening composition may be applied before or during the polishing process. Polishing may occur following the application of hardening composition to the surface, and may continue until, and even after, the surface is dry.

In another embodiment of a hardening composition application method, the hardening composition may be applied to a surface of uncured (e.g., fresh) concrete. As an example, the hardening composition may be applied within thirty minutes following finishing of the surface of the concrete. In another example, the hardening composition may be applied within about three hours after the surface of the concrete has been finished. The hardening compound may be applied to the concrete surface just before or at about the same time as any curing compounds are applied to the surface of the concrete. After the concrete has cured, the surface may be polished.

Once a hardening composition according to the present invention has been applied to a surface, penetrated into the surface, and had an opportunity to provide the desired results (e.g., chemically react with calcium hydroxide) (i.e., the hardening composition has dried), residue of the hardening composition may be removed, or cleaned, from the treated surface. The residue, which consists primarily of silica particles, may be removed from the treated surface simply by sweeping, blowing, or spraying it from the treated surface. No additional chemical treatment or labor (e.g., scrubbing, sanding, scraping, polishing, etc.) are required.

Although the foregoing description contains many specifics, these should not be construed as limiting the scope of the present invention, but merely as providing illustrations of some embodiments. Similarly, other embodiments of the invention may be devised which do not exceed the scope of the present invention. Features from different embodiments may be employed in combination. The scope of the invention is, therefore, indicated and limited only by the appended claims and their legal equivalents, rather than by the foregoing description. All additions, deletions and modifications to the invention as disclosed herein which fall within the meaning and scope of the claims are to be embraced thereby.

What is claimed:

1. A method for hardening concrete, comprising:
    applying a hardening composition having a pH of less than 10 and comprising colloidal silica and a stabilizer comprising aluminum or aluminum oxide to a finished surface of the concrete, the colloidal silica penetrating into the finished surface of the concrete and reacting with calcium hydroxide beneath the finished surface of the concrete,
    without leaving a residue of the hardening composition on the finished surface of the concrete.

2. The method of claim 1, wherein applying comprises applying a hardening composition having a pH of 8 or less to the finished surface of the concrete.

3. The method of claim 1, further comprising:
    polishing the surface while the hardening composition is present on the surface.

4. The method of claim 1, wherein applying comprises applying the hardening composition to a finished surface of concrete that has not completely cured.

5. The method of claim 1, further comprising:
    removing the residue of the hardening composition from the surface, the act of removing consisting essentially of sweeping, blowing, or spraying the residue from the surface.

6. A method for hardening or densifying a hardened cementitious substrate, comprising:
    applying a colloidal silica to a hardened surface of the hardened cementitious substrate;
    enabling the colloidal silica to penetrate the hardened surface; and enabling the colloidal silica to react with calcium hydroxide beneath the hardened surface to increase a hardness of the hardened surface, with no residue of the colloidal silica on the hardened surface.

7. The method of claim 6, wherein applying the colloidal silica comprises applying a colloidal silica, including:

water;

silica particles in a concentration tailored to harden concrete while minimizing silica residue remaining on a treated surface; and a stabilizer comprising aluminum or alumina on the colloidal silica for keeping the silica particles in solution, the low pH composition having a pH of less than 10, to the hardened surface of the hardened cementitious substrate.

8. The method of claim 7, wherein applying the colloidal silica comprises applying a colloidal silica having a pH of 8 or less to the hardened surface of the hardened cementitious substrate.

9. The method of claim 7, wherein applying the colloidal silica comprises applying a colloidal silica having a neutral pH to the hardened surface of the hardened cementitious substrate.

10. The method of claim 7, wherein applying the colloidal silica comprises applying colloidal silica having a pH of about 4 to about 7 to the hardened surface of the hardened cementitious substrate.

11. The method of claim 7, wherein applying the colloidal silica comprises applying to the hardened surface of the hardened cementitious substrate colloidal silica in which the stabilizer is present on the silica particles.

12. The method of claim 7, wherein applying the colloidal silica comprises applying to the hardened surface of the hardened cementitious substrate colloidal silica in which the silica particles have diameters of about 3 nm to about 50 nm.

13. The method of claim 7, wherein applying the colloidal silica comprises applying to the hardened surface the hardened cementitious substrate colloidal silica in which the silica particles have diameters of about 12 nm.

14. The method of claim 7, wherein applying the colloidal silica comprises applying to the hardened surface the hardened cementitious substrate colloidal silica in which the silica particles comprise about 1.5% to about 6% of the weight of the colloidal silica.

15. The method of claim 7, wherein applying the colloidal silica comprises applying to the hardened surface the hardened cementitious substrate colloidal silica in which the silica particles comprise about 4.5% of the weight of the colloidal silica.

16. The method of claim 7, wherein applying the colloidal silica comprises applying to the hardened surface of the hardened cementitious substrate colloidal silica further including at least one surfactant.

17. The method of claim 7, further comprising:

planing, honing or polishing the hardened surface of the hardened cementitious substrate before applying the colloidal silica to the hardened surface of the hardened cementitious substrate.

18. The method of claim 7, further comprising:

polishing the hardened surface of the hardened cementitious substrate while the hardening composition is present on the hardened surface.

19. The method of claim 7, further comprising:

removing the residue of the colloidal silica from the hardened surface, the act of removing consisting essentially of sweeping, blowing, or spraying the residue from the surface.

20. The method of claim 4, further comprising:

polishing or further finishing the finished surface with the hardening composition thereon and before the finished surface is fully cured.

21. The method of claim 1, wherein applying the hardening composition comprises applying a hardening composition in which the colloidal silica will remain in suspension at a pH of about 3.5 or less.

22. The method of claim 1, wherein applying the hardening composition comprises applying a hardening composition including a stabilizer comprising aluminum or alumina on the colloidal silica.

23. The method of claim 1, wherein applying the hardening composition comprises applying an aqueous hardening composition having a solids content based on the weight percent the colloidal silica.

24. The method of claim 23, wherein applying the aqueous hardening composition comprises applying an aqueous hardening composition in which the solids content of the colloidal silica is about 1.5% of the weight of the aqueous hardening composition to about 6.5% of the weight of the aqueous hardening composition.

25. The method of claim 23, wherein applying the aqueous hardening composition comprises applying an aqueous hardening composition in which the solids content of the colloidal silica is about 4.5% of the weight of the aqueous hardening composition.

26. A method for finishing concrete, comprising:

applying a hardening composition to a surface of uncured, fresh concrete, the hardening composition including colloidal silica;

the colloidal silica of the hardening composition reacting with calcium hydroxide at the surface; and polishing the surface, with no residue of the hardening composition on the surface.

27. The method of claim 26, wherein applying the hardening composition to the surface comprises applying the hardening composition to a surface of uncured concrete.

28. The method of claim 26, wherein applying the hardening composition to the surface occurs within about thirty minutes of finishing the surface.

29. The method of claim 26, wherein finishing the surface of the fresh concrete occurs with the hardening composition in place on the surface.

30. The method of claim 29, wherein finishing the surface occurs while the surface is wet.

31. The method of claim 30, wherein finishing the surface continues until the surface is dry.

32. The method of claim 29, wherein finishing the surface comprises polishing the surface.

33. The method of claim 26, wherein applying the hardening compound occurs before finishing the surface.

34. The method of claim 26, wherein applying the hardening composition comprises applying a hardening composition having a solids content of colloidal silica comprising about 4.5% to about 6%, by weight, of the hardening composition.

35. The method of claim 26, wherein applying the hardening composition comprises applying a hardening composition including a stabilizer on particles of the colloidal silica, the stabilizer comprising aluminum or alumina.

36. The method of claim 35, wherein applying the hardening composition comprises applying a hardening composition including an anionic surfactant.

37. The method of claim 26, wherein applying the hardening composition comprises applying a hardening composition in which the colloidal silica will remain in suspension at a pH of about 3.5 or less.

38. The method of claim 26, wherein applying the hardening composition comprises applying a hardening composition having a pH of less than 10 and including a stabilizer comprising aluminum or aluminum oxide.

39. The method of claim 6, wherein applying comprises applying the colloidal silica to a hardened surface comprising cured cement.

40. A method for treating a surface of concrete, comprising:
 applying a hardening composition to a surface of concrete, the hardening composition consisting of:
  colloidal silica;
  a stabilizer selected from the group consisting of aluminum and alumina;
  surfactant; and
  water.

41. The method of claim 40, wherein applying comprises applying the hardening composition to a surface of fresh concrete.

42. The method of claim 40, wherein applying comprises applying the hardening composition to a surface of hardened concrete.

43. The method of claim 42, wherein applying comprises applying the hardening composition to a cured concrete surface.

44. The method of claim 40, further comprising:
 imparting the surface of the substrate with a polished appearance.

45. The method of claim 40, wherein no residue of the hardening compound remains on the surface.

46. The method of claim 12, further comprising:
 removing residual hardening compound from the surface.

\* \* \* \* \*

UNITED STATES PATENT AND TRADEMARK OFFICE
CERTIFICATE OF CORRECTION

| | | |
|---|---|---|
| PATENT NO. | : 8,852,334 B1 | Page 1 of 1 |
| APPLICATION NO. | : 12/366584 | |
| DATED | : October 7, 2014 | |
| INVENTOR(S) | : Hills et al. | |

It is certified that error appears in the above-identified patent and that said Letters Patent is hereby corrected as shown below:

In the Claims:

Claim 46, Column 8, Line 17, change "12" to --45--

Signed and Sealed this
Seventeenth Day of March, 2015

Michelle K. Lee
*Director of the United States Patent and Trademark Office*